United States Patent Office 3,261,658
Patented July 19, 1966

3,261,658
PROCESS OF REACTING CHLOROETHYL-SULFO-
NYL BENZOYL CHLORIDE COMPOUNDS WITH
TEXTILE AUXILIARIES AND REACTING SAID
AUXILIARIES WITH TEXTILE FIBERS
James F. Feeman, West Reading, Pa., assignor to
Crompton & Knowles Corporation, Worcester, Mass.,
a corporation of Massachusetts
No Drawing. Original application June 27, 1960, Ser.
No. 38,733, now Patent No. 3,098,096, dated July 16,
1963. Divided and this application Dec. 10, 1962, Ser.
No. 256,784
4 Claims. (Cl. 8—116)

This application is a divisional application of applicant's S.N. 38,733, filed June 27, 1960, now U.S. Patent 3,098,096.

This invention relates to a new class of compounds; namely, the meta and para benzoyl chlorides having the following structure:

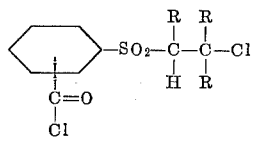

(Structure I)

and also to meta and para derivatives of Structure I compounds which include either of the radicals:

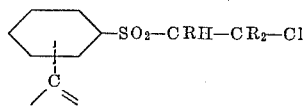

(Structure II)

or

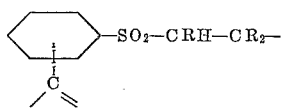

(Structure III)

(In the foregoing structures, and throughout the specification, R represents either —H or -lower alkyl radicals.)

The invention is further concerned with processes for producing the new Structure I type compounds and the corresponding derivatives thereof containing Structure II and III type radicals.

The Structure I type compounds of this invention can be prepared from the corresponding meta or para substituted intermediates; 2 - hydroxyalkylsulfonylbenzoic acids or the 2-chloroalkylsulfonylbenzoic acids. These intermediates need only be treated with reagents which will convert the carboxylic acid group to a carbonyl chloride group in order to form the Structure I compounds. Suitable chlorinating agents for this purpose include thionyl chloride, phosphorous pentachloride, and the like. With such reagents the alkyl hydroxyl group, if present, can also be simultaneously converted to the chloro group. Where the alkyl chloro group is already present, it, of course, is unaffected by these reagents.

The intermediate 2-hydroxyalkylsulfonyl- or 2-chloroalkylsulfonylbenzoic acids are compounds which were heretofore known and may be prepared in various ways. However, for purposes of simplicity, a description of the intermediate preparation will be given in rather general terms and will be confined to cases in which R in Structure I is —H. It will be understood that throughout this application R may also be -lower alkyl, and that compounds wherein R is other than —H may be prepared by replacing ethylene chlorohydrin or ethylene oxide used to form the hydroxyalkylsulfonylbenzoic acids with an appropriate chloroalcohol such as 2-chloropropanol, or with suitable epoxy compounds such as propylene oxide, 1,2-butylene oxide, etc. Two routes for preparing the intermediates are as follows:

A. Reduction of an approprite (3- or 4-)-chlorosulfonylbenzoic acid to the corresponding sulfinic acid, by means of sodium sulfite or by means of zinc and acid; reaction of the sodium sulfinate with ethylene oxide or ethylene chlorohydrin in alkaline solution to produce the 2-hydroxyethylsulfonylbenzoic acid.

B. Condensation of 3- or 4-mercaptobenzoic acid with ethylene chlorohydrin or ethylene oxide followed by oxidation of the 2-hydroxyethylmercaptobenzoic acid (e.g., with sodium hypochlorite or hydrogen peroxide) to the 2-hydroxyethylsulfonylbenzoic acid.

In both of these procedures, the aliphatic hydroxyl may subsequently be replaced with chlorine by treating the product with concentrated hydrochloric acid at elevated temperatures.

The preparation of Structure I compounds from such intermediates will be described in greater detail in the examples which appear later in the specification.

The Structure I compounds can be used to prepare the Structure II and Structure III type derivatives. In most instances, a Structure II type derivative is made first and the Structure III type derivative is prepared from the Structure II derivative.

Structure II type derivatives are prepared from Structure I compounds by reacting such compounds with a material which contains a functional group having a hydrogen which is replaceable under the same conditions as active and displace the aroyl chlorine of the Structure I compound, i.e., a functional group which is capable of replacing the chlorine of a carbonyl chloride.

The beta chlorine and the aroyl chlorine of Structure I compounds have different reactivities; the aroyl chlorine being more reactive than the beta chlorine. Therefore, where it is desired to insure the formation of Structure II derivatives without simultaneously forming any appreciable quantity of Structure III type derivatives, it is necessary to employ reaction conditions which activate and displace the aroyl chlorine of the Structure I compound without at the same time displacing the beta chlorine.

Where the functional group of the material to be reacted with the Structure I compound to form a Structure II derivative is an amino group, the reaction can in most instances be carried out without significant displacement of the beta chlorine if the pH of the reaction mass is held at or below about 7. The positioning of the functional group, the temperature of the reaction mass, and the mole ratios of the reactants can also influence the nature of the products formed. In all instances, where the positioning of the amino group is such that its activation will require the employment of reaction conditions which are somewhat more favorable to the displacement of the beta chlorine, it is preferred that the molar concentration of the Structure I compound should equal or exceed the molar concentration of the material to be reacted to form the Structure II derivative; this will tend to insure preferential displacement of the aroyl chlorine.

Structure III type derivatives are usually prepared from Structure II derivatives; however, in some instances it is possible to go from a Structure I compound to a Structure III derivative in a single operation without the intermediate formation of a Structure II derivative.

The Structure III derivatives are prepared from intermediates having Structure II derivatives by reacting such an intermediate with a material which contains a functional group having a hydrogen which is replaceable under the same conditions as activate and displace the beta chlorine of the Structure II derivative, i.e., the functional group of the material must be one which is capable of reacting with a chloroalkylsulfonyl group.

When the functional group on the material to be reacted with a Structure II intermediate or derivative is an amino group such as —NH$_2$ or —NH—, reaction can be effected under either acid or alkaline conditions. However, care must be taken to avoid carrying out the reaction under extremely alkaline or extremely acid conditions which are capable of causing hydrolysis of the amide linkage, and the actual pH conditions employed will be determined by the stability of the reactants and reaction products.

When the functional group on the material to be reacted with a Structure II intermediate or derivative is a hydroxyl group, reaction can preferably be effected under alkaline conditions such as those provided by strong bases. Sodium hydroxide, trisodium phosphate, and the like are especially usefull as acid binding agents for establishing the desired condition of alkalinity. In most instances the alkalinity should be comparable to that provided by sodium hydroxide solutions containing from about ½ to 4% NaOH by weight. With many materials which contain —OH as functional groups, the reaction will proceed readily at room temperatures; in some instances, however, it is desirable to accelerate the reaction by heating—frequently temperatures as high as 100° C. are employed. The upper temperature limit, however, is not critical so long as the reactants and reaction products are capable of withstanding particular temperatures employed.

Most natural and synthetic textile fibers are long chain polymers which have functional groups such as —NH—, —NH$_2$ and —OH at various points along the chain. The cellulosics, such as cotton and viscose rayon are typical textile fibers with hydroxyls as functional groups. The cellulosics are not adversely affected to a significant degree when treated under alkaline conditions which will displace the beta chlorine of Structure II derivatives. Wool, silk and nylon are typical textile fibers which have functional amino groups and such fibers (sometimes herein referred to as polyamide fibers) are relatively stable under neutral or certain acid conditions which can be employed to displace the beta chlorine of Structure II derivatives.

Therefore, the Structure I compounds are useful as reagents for durably attaching to textile fibers those materials which can be reacted with Structure I compounds to give Structure II derivatives.

Many presently known textile auxiliaries include amino groups in their structures at desirable attachment points, or such functional groups can usually be introduced by appropriate techniques. Many auxiliaries will not per se react with textile fibers. Hence, the Structure I compounds are useful in the preparation of fiber reactive textile auxiliaries or for enhancing the fiber reactivity of auxiliaries which have a poor or low order of reactivity.

As used herein, the term "textile auxiliary" is to be construed as referring to substances used in the dyeing and finishing of textiles (e.g., anticrease agents, antifume agents, antiseptic agents, antislip agents, antistatic agents, atmospheric-fading protective agents, developers, diazo bases, dye intermediates, flashing agents, fire and flame resistants, fungicides, germicides, insect repellants (including moth resists), mildew preventatives, mordants, softeners, water repellants, optical brighteners, and especially dyes of all kinds).

When a textile auxiliary which has a functional group such as —NH$_2$, —NH—, or the like, reacts with a Structure I compound, different types of Structure II derivatives are formed which are illustrated by the following structure:

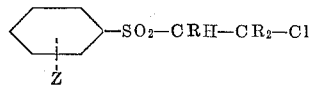

(Structure IIa)

wherein Z represents the meta and para substituent groups

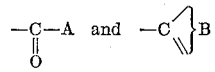

(In the foregoing structure, and throughout the specification, A represents a textile auxiliary attached through a functional group from which a hydrogen has been displaced, and B represents the residue provided by a textile auxiliary which is capable of forming a heterocyclic system upon condensation with a carbonyl chloride.)

Where it is desired to produce a Structure II type derivative having the following structure:

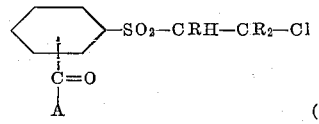

(Structure IIa–1)

a Structure I compound is reacted with a textile auxiliary having a functional group, such as —NH$_2$ or —NH— at the desired point of attachment. Generally the reaction is carried out under essentially neutral conditions. Acid binding agents such as sodium bicarbonate, sodium acetate, sodium carbonate, etc. can be employed to assist in effecting the reaction; however, where it is intended that the reaction product be one which is capable of further reaction with substances or materials having functional groups, the beta chlorine of the chloroalkyl sulfone should not be replaced, and therefore the pH of the reaction should be kept substantially neutral.

Where it is desired to produce Structure IIa type derivatives in which Z is —C⩽}B, the Structure I type compound is condensed with a compound having two functional groups positioned so that a heterocyclic ring system is formed; for example, the ortho aromatic diamines and other similar polyfunctional compounds containing at least one amino group and which are condensable under neutral conditions to form a heterocyclic ring system.

Structure IIa type derivatives will react with materials having functional hydroxyl and amino groups to produce derivatives having the structure:

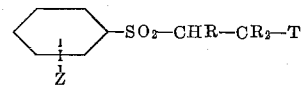

(Structure IIIa)

(In the foregoing structure, and throughout the specification, T represents any material attached through a functional group from which a hydrogen has been displaced. The symbol —f is sometimes used in lieu of —T to designate a textile fiber which is attached through a functional group from which a hydrogen has been displaced.)

Where the Structure IIa–1 type derivative is a cellulose reactive, water-soluble dye, the reaction to attach such a dye to a cellulosic fiber is usually carried out in an alkaline medium which also contains a migration inhibitor (such as sodium chloride, sodium sulfate, and the like) which will prevent the dye from bleeding back in the alkaline bath before attachment.

According to the invention, it is also possible to use the Structure II type radicals to link two dyes having different properties and thereby provide a new homogenous dye of still different character having the structure:

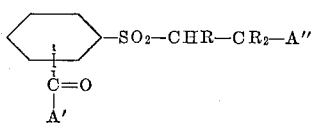

(Structure IIIb)

(A' and A" representing different dyes, each dye being attached through a functional group from which a hydrogen has been displaced.) Thus, for example, a blue dye can be linked to a yellow dye to give a green dye.

The Structure I compounds of this invention, as mentioned previously, are especially useful for preparing textile auxiliaries of Structure II which are then rendered reactive with various fibrous materials which contain in their structure, functional or reactive hydroxyl groups or amino groups and, when so reacted to form Structure III type derivatives, the linkages are stable to stringent washing conditions, and enable imparting many highly desirable durable characteristics to the fibrous materials.

Prominent in importance among the textile auxiliaries for use in accordance with the present invention are dyes. After reaction or attachment to textile fibers, the dyeings prepared in accordance with this invention possess brightness and washfastness to a degree which is unobtainable with the dyes applied in a conventional manner. As previously noted, the Structure I compounds of this invention may be attached to auxiliaries through any suitable functional grouping which is capable of replacing the chlorine of a crabonyl chloride group, the most important of which are the amino groups —NH$_2$ and —NH—. Amino groups are present in or can be introduced in a great number of dyes of different types, e.g., azo, anthraquinone, basic, diphenylmethane, phthalocyanine, triphenylmethane, nitro, nitrodiphenylamine, etc.

Textile auxiliaries other than dyes may also be condensed by means of amino groups (or other functional groups present in their structure) with the carbonyl chloride groups of the compounds of this invention, thereby imparting to these auxiliaries the possibility of attachment, by means of the chloroethylsulfonyl radical, to fibrous and other similar materials which have functional groups that can react with a chloroalkylsulfonyl and displace the chlorine.

However, utility of the Structure I compounds as activating and linking reagents is not limited to the textile field; they can be used to form bridges or links (as in Structure II) between any compatible materials which include functional groups of the type described above.

The following examples will serve to illustrate the preparation of the various compounds and derivatives of this invention. In the examples, unless otherwise indicated, parts are by weight, temperature is given in degrees centigrade, and percentages are by weight.

*Example 1*

The preparation of 4-(2-chloroethylsulfonyl)-benzoyl chloride.

154.2 parts of 4-mercaptobenzoic acid are dissolved at 35° in 1500 parts of water containing 100 parts of sodium hydroxide, and treated dropwise in 30 minutes with 85 parts of ethylene chlorohydrin. After stirring 15 minutes longer, concentrated hydrochloric acid is added until the pH is 1.5, and the nearly quantitative, colorless precipitate of 4-(2-hydroxyethylmercapto)benzoic acid is filtered, washed with cold water and dried. The crude material melts at 146–8°; recrystallization from water raises the melting point to 151–3°.

198.2 parts of 4-(2-hydroxyethylmercapto)-benzoic acid are dissolved in 1000 parts of water containing 40 parts of sodium hydroxide. At 20° 1200 parts of commercial sodium hypochlorite solution (12.4% NaOCl) are added dropwise during two hours. The solution is warmed during one hour to 45°, and in 45 minutes longer to 70°, when the presence of sodium hypochlorite is no longer detectable with starch-iodide paper. The solution is cooled externally to 20°, hydrochloric acid is added to pH 1.5, and the colorless crystalline precipitate of 4-(2-hydroxyethylsulfonyl)-benzoic acid is filtered. The crude product is purified from water by recrystallization giving 163 parts (71% of theoretical) of product which melts at 185–9°. Recrystallization from 95% ethanol gives 100 parts of pure material melting at 193–4°.

93 parts of pure 4-(2-hydroxyethylsulfonyl)-benzoic acid and 0.5 part of pyridine are treated with 180 parts of high-grade thionyl chloride at 30° in ten minutes. The mixture is slowly warmed to 90° (during three hours), becoming quite viscous at first, but finally giving a clear solution. After heating at 90° for 1.5 hours longer, the solution is cooled to 75°, 100 parts of benzene are added, and the benzene-thionyl chloride mixture is distilled off to a temperature of 95° in the pot. A second portion of 100 parts of benzene is distilled off in similar fashion, to a pot temperature of 130°, leaving 116 parts of oil. Upon cooling, the oil solidifies to a light colored solid which melts at 95–7°. Recrystallization from benzene gives colorless crystalline product melting at 96–7°. Identified as 4-(2-chloroethylsulfonyl)-benzoyl chloride.

*Example 2*

The preparation of 3-(2-chloroethylsulfonyl)-benzoyl chloride.

Using 3-mercaptobenzoic acid (prepared from a commerically available m-aminobenzoic acid) in place of 4-mercaptobenzoic acid in Example 1, gives the corresponding 3-(2-hydroxyethylmercapto)-benzoic acid. The crude product which melts at 70–75° is obtained in 70% overall yield from the m-aminobenzoic acid. Recrystallization from water raises the melting point to 90–91°.

198.2 parts of 3-(2-hydroxyethylmercapto)-benzoic acid are dissolved in 1000 parts of water containing 40 parts of sodium hydroxide, and oxidized in the manner described in Example 1 using 1200 parts of commercial sodium hypochlorite solution to form 3-(2-hydroxyethylsulfonyl)-benzoic acid. The crude product is recrystallized from water giving 166 parts of colorless material melting at 160–4°. Recrystallization from 95% ethanol gives 138 parts of product which melts at 167–8°.

161 parts of pure 3-(2-hydroxyethylsulfonyl)-benzoic acid, 0.5 part of pyridine, and 350 parts of high-grade thionyl chloride are mixed and warmed during 2.5 hours to 90°. The resultant solution is freed of excess thionyl chloride as described in Example 1 by addition and distillation of several portions of anhydrous benzene. The oily residue weighs 190 parts (theory is 187 parts). Upon cooling the product becomes crystalline and then has a melting point of 55–7°. It is very soluble in solvents such as benzene and acetone. This has been identified as 3-(2-chloroethylsulfonyl)-benzoyl chloride.

*Example 3*

Twelve parts of 7-amino-1-naphthol-3-sulfonic acid are dissolved at pH 7.5 by means of three parts of sodium carbonate in 100 parts of water, and with vigorous stirring, there are added 8 parts of sodium bicarbonate and a solution of 14 parts of 3-(2-chloroethylsulfonyl)-benzoyl chloride in 20 parts of acetone. Reaction is complete in a few minutes. The resultant solution contains the compound of the structure:

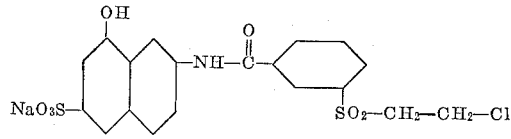

This solution may be used directly for application to fibrous materials as a developer for any suitable free or stabilized diazonium salt as set forth in Example 4. It may also be used in solution as a coupler in the manufacture of reactive dyes. The compound can be isolated by salting, dried, and used subsequently as a coupler or developer.

*Example 4*

A solution of one part of the product of Example 3 in 50 parts of water at 25° is used to impregnate a piece of spun rayon fabric; the fabric is dried; and it is then impregnated with a 1% sodium hydroxide–30% sodium chloride solution in water. The fabric is cured for five minutes at 105°, rinsed well in water, rinsed in 1% sodium bicarbonate solution in water, and scoured at the boiling point in water containing 0.1% of a non-ionic detergent (Triton X–100, a non-ionic surface active agent manufactured by Rohm & Haas Company). The fabric is rinsed and dried, and now has a pale straw color, which changes to yellow in alkaline solution. The fabric is cut into three pieces and developed in cold 5% sodium carbonate solution by addition of solutions of the following diazonium salts to the individual pieces to give very washfast colors as follows:

Diazonium salt solution from:
    Metanilic acid—scarlet
    4-methoxymetanilic acid—red
    5-amino-6-methoxynaphthalene - 2 - sulfonic acid—violet

Example 5

24 parts of 7-amino-1-naphthol-3-sulfonic acid, dissolved in 200 parts of water at 30° with 6 parts of sodium carbonate, is treated with 16 parts of sodium bicarbonate and then with vigorous stirring with a solution of 28 parts of 3-(2-chloroethylsulfonyl)-benzoyl chloride in 40 parts of acetone. After five minutes, the resultant solution is iced to 15° and 20 parts of sodium bicarbonate is added. Meanwhile a neutral solution of 21 parts of 4-methoxymetanilic acid is acidified with 25 parts of concentrated hydrochloric acid and diazotized at 0° with a solution of 7 parts of sodium nitrite in 25 parts of water. This diazonium salt solution is added slowly with good stirring to the coupler solution at pH 7.0 to 7.5 and at 10°. After one hour the pH is lowered to 5.0 with 20 parts of acetic acid and the solution (800 parts) is treated with 80 parts of sodium chloride. The precipitated red dye is filtered and dried in vacuo, giving 83 parts of dye which is reactive with cellulosic fibers and has the structure:

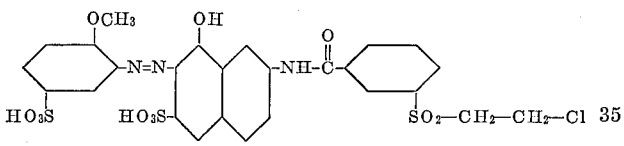

Example 6

In Example 5, while otherwise proceeding as described, if the 21 parts of 4-methoxymetanilic acid is replaced with 18 parts of metanilic acid, a new reactive dye is obtained having the following structure and dyeing cellulosic fibers scarlet shades of excellent wash fastness and good fastness to light.

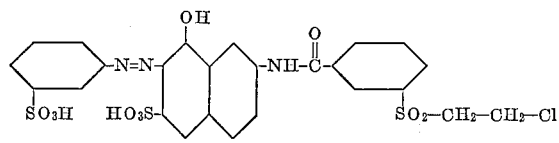

Example 7

A neutral solution of 18.8 parts of 2,5-diaminobenzenesulfonic acid in 200 parts of water at 40° is stirred vigorously and treated with a solution of 27 parts of 4-(2-chloroethylsulfonyl)-benzoyl chloride in 100 parts of acetone. After completion of the reaction, the pH is lowered to 5 with acetic acid and the colorless crystalline product filtered. It has the structure:

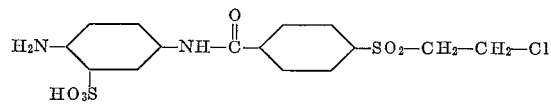

This dye *intermediate* may be applied directly to fibrous materials or used as an intermediate and converted into reactive dyes by diazotization and coupling reactions.

Example 8

A solution of one part of the product of Example 7 in 50 parts of water at 25° is padded onto a piece of spun rayon fabric. The fabric is dried, impregnated with 1% sodium hydroxide-30% sodium chloride solution in water, cured in the oven at 105°, rinsed in water, then in 1% sodium bicarbonate solution, and scoured at the boil with water and 0.1% non-ionic detergent. After rinsing well, the fabric is placed in an ice-cold bath containing excess nitrous acid, and allowed to remain there ten minutes. The fabric is then rinsed in cold water, cut into a number of pieces, and the pieces introduced individually into alkaline solutions containing excess amounts of water-soluble developers. The following table gives some of these developers and the colors they furnish, which are very fast to washing, and have good to excellent fastness to light:

| Developer: | Color |
|---|---|
| Barbituric acid | Yellow. |
| 3-methyl-1-(p-sulfophenyl)-2-pyrazol-5-one | Yellow. |
| Resorcinol | Orange. |
| 3-hydroxy-2-naphthanilide | Red. |
| 6-amino-1-naphthol-3-sulfonic acid | Scarlet. |
| 8-amino-1-naphthol-3,6-disulfonic acid | Maroon. |

Example 9

A neutral solution of 2,5-diaminobenzenesulfonic acid (9.4 parts) in 100 parts of water at 40° is treated, while stirring vigorously, with a solution of 14 parts of 3-(2-chloroethylsulfonyl)benzoyl chloride in 25 parts of acetone. When the more basic 5-amino group has been acylated completely, the pH of the solution is lowered to 5 with acetic acid and the product is separated. It is then diazotized at 0° in the presence of excess hydrochloric acid with a solution of 3.5 parts of sodium nitrite. Addition of the diazonium salt to a neutral solution of 12.7 parts of 3 - methyl - 1 - (4-sulfophenyl)-2-pyrazol-5-one in 250 parts of water containing 15 parts of sodium bicarbonate, gives a yellow solution, from which the dyestuff of the formula

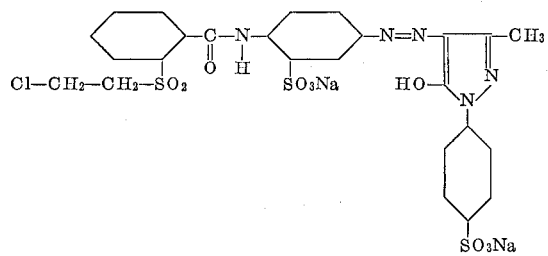

is separated by addition of 125 parts of sodium chloride. The filtered crystalline dye is dried in vacuo at 30°, and is reactive with cellulosic fibers giving washfast and lightfast yellow shades.

Example 10

Eleven parts of the monoazo dye obtained by alkaline coupling of diazotized 2-amino-1-phenol-4-sulfonic acid and 6-amino-1-naphthol-3-sulfonic acid is dissolved in 200 parts of water. It is coppered by adding 4.5 parts of anhydrous sodium acetate and a solution of 6.5 parts of $CuSO_4 \cdot 5H_2O$ in 25 parts of water, and heating at 90° for one hour. The solution obtained is made slightly alkaline with sodium carbonate and clarified from a small amount of insoluble matter. It is then treated at 40° and pH 7.0 to 7.5 in the presence of 4 parts of sodium bicarbonate with solution of 7 parts of 3-(2-chloroethylsulfonyl)-benzoyl chloride in 20 parts of acetone. The resultant solution is salted 5% by volume with sodium chloride at pH 5 giving a crystalline precipitate which is filtered and dried in vacuo. The new dye is reactive with cellulose giving bluish-red shades of excellent fastness to both light and washing.

Example 11

3-nitro-4-chlorobenzenesulfonic acid (23.8 parts) as a neutral solution in 400 parts of water is mixed with 25 parts of sodium carbonate and 12 parts of p-phenylenediamine, and the mixture heated at 90° for two hours. The yellow-brown solution which is produced is filtered, and the product isolated by acidification with hydrochloric acid. The product is then dissolved in 400 parts of water at pH 7.5 by means of sodium carbonate, and treated with 30 parts of sodium bicarbonate, followed by a solution of 28 parts of 4-(2-chloroethylsulfonyl)-benzoyl chloride in 100 parts of acetone. The reddish-yellow product precipitates and is filtered, washed once with 50 parts of water, and dried in vacuo. Viscose rayon padded in a solution of the product in water at 80°, dried, treated with a 1% NaOH-30% NaCl solution, cured at 105°, and washed in water containing a non-ionic detergent (Triton X–100), is dyed a wash fast and light fast orange-yellow shade.

*Example 12*

A solution of 71.4 parts of the compound of the formula

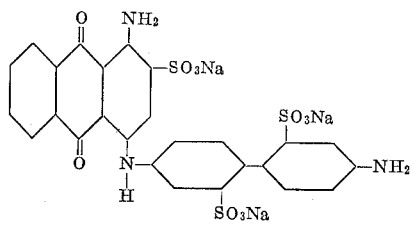

(prepared by condensation of 1-amino-4-bromo-anthraquinone-2-sulfonic acid with 4,4'-diaminobiphenyl-2,2'-disulfonic acid) in 600 parts of water and 20 parts of sodium bicarbonate at pH 7.5 is treated at 50° with a solution of 28 parts of 3-(2-chloroethylsulfonyl)-benzoyl chloride. After 30 minutes the pH is lowered to 5.0 with acetic acid, and the product is isolated by salting and dried in vacuo. It is a blue solid which is reactive, giving blue dyeings which are fast to light and washing.

*Example 13*

77.1 parts of the compound of the formula

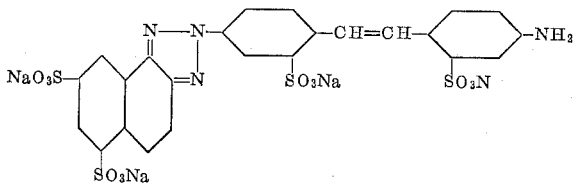

(prepared according to the procedure outlined in U.S. Patent 2,795,577, Example 6) in 1600 parts of water and 28 parts of sodium bicarbonate is treated with 28 parts of 4-(2-chloroethylsulfonyl)-benzoyl chloride in 100 parts of acetone at 50°. After thirty minutes the solution is filtered and 350 parts of sodium chloride added. The crystalline precipitate is isolated by filtration and dried in vacuo. The product in aqueous solution fluoresces bright green-white under ultraviolet light, and reacts with cellulosic fibers imparting optical brightness which is fast to washing and light.

*Example 14*

A neutral solution of 53.3 parts of the compound of the formula

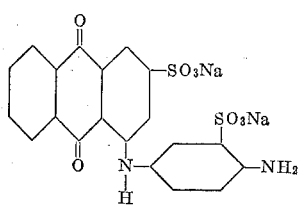

(prepared by condensation of 2,5-diaminobenzenesulfonic acid with 1-amino-4-bromoanthraquinone-2-sulfonic acid) in 1200 parts of water with 40 parts of sodium bicarbonate is treated at 55° with a solution of 35 parts of 4-(2-chloroethylsulfonyl)-benzoyl chloride in 100 parts of acetone. The mixture is stirred two hours at 40 to 50°, the pH lowered to 5 with acetic acid, the blue dye salted out, filtered, and dried in vacuo. It dyes cellulosic fibers in bright blue shades which are fast to light and washing.

*Example 15*

One part of the dye obtained in Example 10 is dissolved in 100 parts of water. A cotton fabric is impregnated with the solution thus prepared to an increase in weight of 100%, and dried. The fabric is then impregnated with a solution at 25° containing 1% sodium hydroxide and 30% sodium chloride, squeezed to an increase in weight of 100%, steamed for three minutes at 100° to 105°, rinsed, washed for ten minutes in a 0.2% boiling solution of Triton X–100, rinsed and dried. A bright bluish-red dyeing is obtained which has excellent fastness to washing and to light.

*Example 16*

5,6-diamino-1-naphthol-3-sulfonic acid (25.4 parts) is dissolved as the sodium salt in 200 parts of water and then treated with 20 parts of sodium bicarbonate and a solution of 28 parts of 4-(2-chloroethylsulfonyl)-benzoyl chloride in 100 parts of acetone. The resultant solution is then coupled in the presence of excess sodium bicarbonate with a diazonium salt solution obtained from 17.3 parts of metanilic acid, giving a red dye which is reactive with cellulosic fibrous material of good light and washing fastness. The dye has the probable constitution:

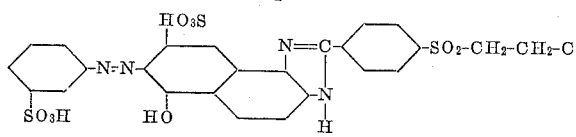

*Example 17*

One part of reactive dye prepared according to Example 6 is dissolved in 1000 parts of water at pH 5 and 100°; a wool fabric weighing 50 parts is entered into the bath and agitated thoroughly. After fifteen minutes, one part of acetic acid is added and agitation is continued for 45 minutes at 100°. The fabric is removed, rinsed and dried. It is dyed a brilliant red shade and the color has excellent fastness to washing and good fastness to light.

When 50 parts of a nylon fabric is used to replace the 50 parts of wool fabric of the preceding example, the nylon is dyed similarly and the color has similar fastness properties.

*Example 18*

Forty-one parts of the compound of the formula:

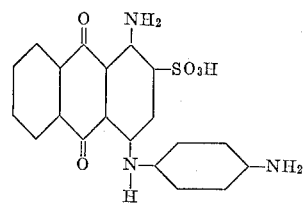

is dissolved at pH 7.5 in 1000 parts of water at 40°, 20 parts of sodium bicarbonate is added, and then a solution of 28 parts of 3-(2-chloroethylsulfonyl)-benzoyl chloride, dissolved in 40 parts of acetone, is added. The product having the structure:

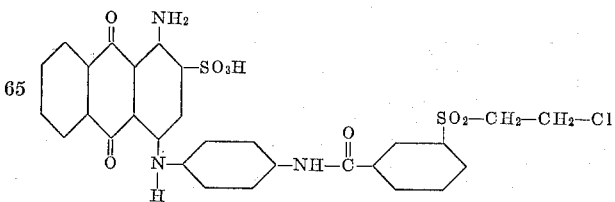

precipitates. The pH is lowered to 5 with acetic acid, the blue dye is separated by filtration and dried in vacuo. It dyes wool, nylon, silk and other polyamide and proteinaceous fibers in red-blue shades having good fastness to light and washing.

Example 19

One part of the dye prepared in Example 18 is dissolved in 1000 parts of water at pH 6.5 and 100°, and a nylon fabric weighing 50 parts is entered. The fabric is agitated in the solution for one hour at 100°, rinsed and dried. It is colored a navy-blue shade which is of very good washing and light fastness.

Example 20

The compound (42 parts) of the formula:

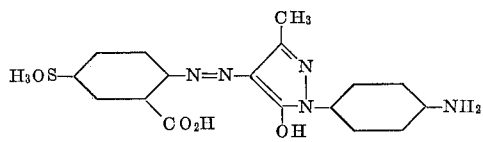

is dissolved at neutral pH in 600 parts of water at 25° and treated successively with good stirring with 40 parts of sodium bicarbonate and a solution of 28 parts of 4-(2-chloroethylsulfonyl)-benzoyl chloride in 150 parts of acetone. No free aromatic amino groups are present after a few minutes. Then a solution of 41 parts of the compound of the formula:

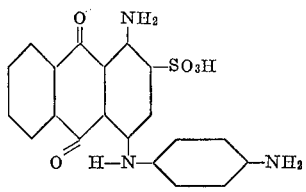

at pH 7 in 600 parts of water is added, and the resultant solution is heated to 100° and held there for four hours. A solution of 25 parts of copper sulfate pentahydrate in 100 parts of water is added carefully and the resultant slurry heated one hour more. The resultant green dye is filtered and dried. It dyes natural and synthetic polyamide fibers in bright green shades, and is the copper complex of the dye of structure:

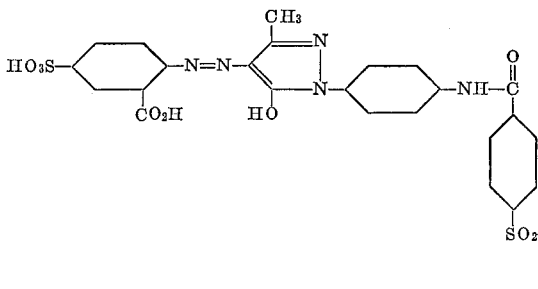

I claim:

1. The method of attaching textile auxiliaries to textile fibers where said auxiliary has a functional group which is capable of replacing the chlorine of carbonyl chloride and where said textile fiber has a functional group capable of reacting with a chloroalkylsulfonyl group, said method comprising reacting, under substantially neutral conditions, the auxiliary with a compound selected from the group consisting of the meta and para substituted compounds having the structure

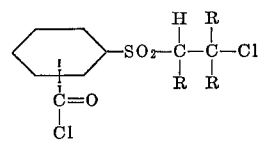

wherein R is a radical selected from the group consisting of —H and -lower alkyl, to form the derivative having the structure

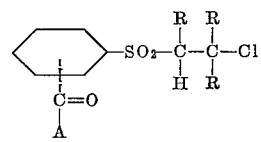

(wherein A is the auxiliary attached through a functional group from which a hydrogen has been displaced), applying the derivative to the textile fiber, and reacting the derivative and the textile fiber to form

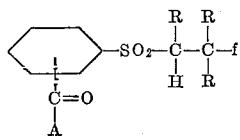

(wherein f represents a textile fiber attached through a functional group from which a hydrogen has been displaced).

2. The method according to claim 1 wherein the textile fiber is cellulosic and the reaction of the derivative and the fiber is carried out in the presence of an acid binding agent.

3. The method according to claim 2 wherein the derivative is water soluble and the reaction between the derivative and the textile material is carried out in the presence of an acid binding agent and a migration inhibitor.

4. The method according to claim 1 wherein the textile fiber contains functional amino groups.

No references cited.

NORMAN G. TORCHIN, *Primary Examiner.*

H. WOLMAN, *Assistant Examiner.*

UNITED STATES PATENT OFFICE
CERTIFICATE OF CORRECTION

Patent No. 3,261,658　　　　　　　　　　　　　　　July 19, 1966

James F. Feeman

It is hereby certified that error appears in the above numbered patent requiring correction and that the said Letters Patent should read as corrected below.

Column 2, line 3, for "approprite" read -- appropriate --; line 31, for "active" read -- activate --; column 3, line 63, for "flashing" read -- finishing --; column 5, line 16, for "crabonyl" read -- carbonyl --; column 6, lines 15 and 19, for "m-", each occurrence, read -- m- --, in italics; column 8, line 12, for "p-" read -- p- --, in italics; lines 33 to 43, the left-hand portion of the formula should appear as shown below instead of as in the patent:

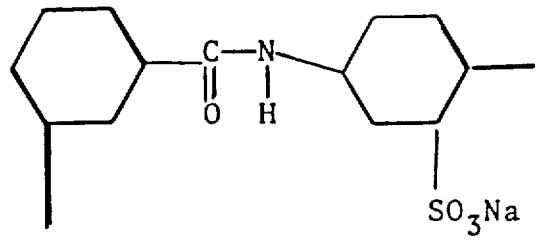

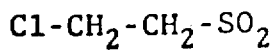

column 9, line 25, for "diamonobiphenyl" read -- diaminobiphenyl --; lines 36 to 43, for that portion of the formula reading　　　　　　　　　　　　read

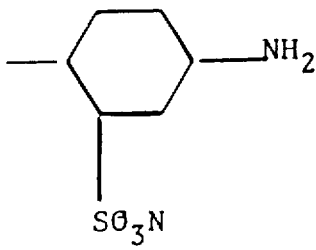　　　　　　　　　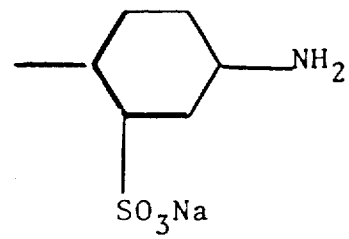

same column 9, lines 58 to 66, for that portion of the formula reading 3,261,658

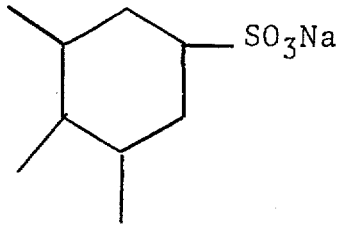   read   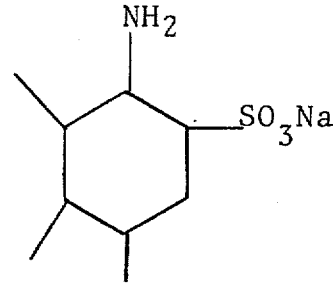

column 10, lines 25 to 30, for that portion of the formula reading "———$SO_2$-$CH_2$-$CH_2$-C" read -- ——$SO_2$-$CH_2$-$CH_2$-Cl --.

Signed and sealed this 15th day of August 1967.

(SEAL)
Attest:

EDWARD M. FLETCHER, JR.
Attesting Officer

EDWARD J. BRENNER
Commissioner of Patents